United States Patent
Novo

(10) Patent No.: US 7,258,541 B2
(45) Date of Patent: Aug. 21, 2007

(54) THERMAL EXPANSION COMPENSATION SUPPORT

(76) Inventor: Rui Novo, 13 Meadow Oak Place, North York, Ontario (CA) M9N 3Z4

(*) Notice: Subject to any disclaimer, the term of this patent is extended or adjusted under 35 U.S.C. 154(b) by 64 days.

(21) Appl. No.: 11/325,524

(22) Filed: Jan. 5, 2006

(65) Prior Publication Data
US 2007/0156637 A1   Jul. 5, 2007

(51) Int. Cl.
B29C 45/17 (2006.01)
B29C 45/72 (2006.01)

(52) U.S. Cl. .................. 425/472; 425/547; 403/28; 267/182

(58) Field of Classification Search ............ 425/547, 425/549; 403/28–30; 267/150, 160, 161, 267/181, 182
See application file for complete search history.

(56) References Cited

U.S. PATENT DOCUMENTS

| 3,563,527 | A  | * | 2/1971  | Tillman  | 267/181 |
| 4,682,945 | A  | * | 7/1987  | Schad    | 425/549 |
| 6,309,207 | B1 | * | 10/2001 | Kalemba  | 425/549 |
| 6,368,542 | B1 | * | 4/2002  | Steil et al. | 264/328.14 |
| 7,189,071 | B2 | * | 3/2007  | Olaru    | 425/563 |

* cited by examiner

*Primary Examiner*—Robert Davis
*Assistant Examiner*—Marissa W. Chaet
(74) *Attorney, Agent, or Firm*—Elias Borges

(57) ABSTRACT

An improved thermal expansion compensation manifold support is disclosed. The support includes a spring having a barrel and a skirt extending from the barrel, the skirt forming a recess. The spring has a first shoulder extending into the recess, and an end opposite the barrel. The support also includes a block having opposite ends, a finger portion formed at one end and a second shoulder formed at the opposite end. The finger has an end opposite the second shoulder, with the finger being dimensioned and configured to be inserted into the skirt's recess. The skirt and the block are dimensioned and configured such that when the finger is inserted into the recess, the skirt end abuts against the second shoulder and the finger end is separated from the first shoulder by a gap. The spring is made of a resilient metal and the skirt is dimensioned and configured such that the skirt forms a resilient spring allowing the support to be movable between a first position wherein the end of the finger is separated from the first shoulder by the gap, and a second position wherein the finger end abuts the first shoulder. The spring biases the support towards its first position.

10 Claims, 4 Drawing Sheets

THERMAL EXPANSION COMPENSATION SUPPORT

FIELD OF THE INVENTION

The present invention relates to hot runner injection molding systems, and more particularly to a thermal expansion compensation support for a manifold used in a hot runner injection molding system.

DESCRIPTION OF THE RELATED ART

In hot runner injection molding systems a heated manifold is provided to convey molten plastic molding material from a source, such as a plastication barrel, to a plurality of injection nozzles. The nozzles are in fluid communication with respective mold cavities that define the shapes of parts to be molded. The manifold is heated to maintain the molten plastic material at a desired elevated temperature so that the material does not cool excessively as it flows from the plastication barrel to the mold cavities. The heat is typically provided by electrical heating elements within the manifold, or by circulating heated fluids through passageways within the manifold. The added heat maintains the molding material in a fluid state so it can readily be conveyed and completely fill the respective mold cavities to provide fully formed molded parts. Although the manifold is heated, the adjacent structural elements of the injection molding machine, which generally include a clamp plate and an injection nozzle retainer plate, are not heated and may actually be cooled by adjacent mold elements.

The hot runner manifold is generally spaced from the adjacent structural elements of the machine by spacers or supports, which are often disc-shaped or annular metallic members that serve to support the hot runner manifold within the mold assembly and space the manifold from the adjacent mold elements. The molding material is conveyed to the hot runner manifold, and then conveyed through the manifold to the respective injection nozzles. When starting such an injection molding machine from a "cold" (start-up) condition, the hot runner manifold is initially spaced from the respective adjacent machine structural elements at a predetermined distance. This spacing distance diminishes when the manifold expands as its temperature increases during the course of the operation of the injection molding machine. However, the adjacent structural elements, which are not directly heated, are at a lower temperature and therefore expand to a lesser degree.

As the molten molding material is conveyed from the plastication barrel to the hot runner manifold and from the manifold to the respective mold cavities, it passes through flow passageways that must remain aligned with each other to prevent leakage of the fluent molding material. Thus, it is essential that the molding material flow passageways within the respective adjoining elements of the machine be properly aligned throughout the machine warm-up process and subsequent operation, even though the parts expand at different rates and may ultimately have different operating temperatures.

In the past, various structural arrangements have been proposed in an effort to ensure that the respective parts of a hot runner injection molding machine are properly aligned and are arranged in leak-tight relationship. For example, in U.S. Pat. No. 4,588,367, entitled "Hot Runner Manifold For Injection Molding Machine", which issued on May 13, 1986, to Schad, the injection nozzle is retained in sealing engagement with a hot runner manifold block by means of a pair of Belleville washers. These springs are positioned to maintain engagement between the injection nozzles and the manifold block from initial start-up, through warm-up, to normal operating temperature. However, if the springs were to fail either before or during the time the machine is at normal operating temperature, the failure of the springs would allow the flow passageway between the injection nozzle and the manifold block to open. The parts would separate as a result of removing the spring force, thereby allowing the molten molding material to leak from the open flow passageway into the space between the manifold block and the mold plate, possibly interfering with the molding process by not supplying sufficient material to form the part properly.

Another arrangement for maintaining contact between a manifold block and a nozzle to avoid molding material leakage involves the use of a somewhat flexible spacer. Such an arrangement is disclosed in U.S. Pat. No. 5,125,827, entitled "Injection Molding Apparatus Having An Insulative And Resilient Spacer Member", which issued on Jun. 30, 1992, to Gellert. That patent discloses the use of an annular metallic spacer that is positioned between a hot runner manifold and the clamp plate that contacts the plastication barrel. The spacer is defined by a plurality of peripherally interconnected, V-shaped concentric rings that allow the spacer to deflect during the expansion of the manifold block relative to the clamp plate during warm-up to maintain the parts that define the material flow passageway in contact with each other. However, the structure of the spacer and the elasticity of the metallic material from which it is formed limits the degree of deflection that the spacer can undergo, and therefore full sealing contact of the injection nozzle and the manifold block throughout the range from cold start-up to full operating temperature cannot be achieved.

SUMMARY OF THE INVENTION

It is an object of the present invention to overcome the deficiencies of the spacer configurations in the prior art arrangements. It is another object of the present invention to provide a thermal expansion compensation support that is effective to maintain the parts that define the material flow passageway in continuous contact throughout the range of operation of a hot runner injection molding machine, from cold start-up through normal operating temperature, without allowing leakage of molding material from between the adjoining mold elements within which the molten material flow channel is provided.

Briefly stated, in accordance with one aspect of the present invention, a thermal expansion compensation support is provided in a hot runner mold assembly. The support includes a spring having a barrel and a skirt extending from the barrel, the skirt forming a recess. The spring has a first shoulder extending into the recess, and an end opposite the barrel. The support also includes a block having opposite ends, a finger portion formed at one end and a second shoulder formed at the opposite end. The finger has an end opposite the second shoulder, with the finger being dimensioned and configured to be inserted into the skirt's recess. The skirt and the block are dimensioned and configured such that when the finger is inserted into the recess, the skirt end abuts against the second shoulder and the finger end is separated from the first shoulder by a gap. The spring is made of a resilient metal and the skirt is dimensioned and configured such that the skirt forms a resilient spring allowing the support to be movable between a first position wherein the end of the finger is separated from the first shoulder by the gap, and a second position wherein the finger end abuts the first shoulder. The spring biases the support towards its first position.

BRIEF DESCRIPTION OF THE DRAWINGS

In the drawings like characters of reference indicate corresponding parts in the different figures.

DESCRIPTION OF THE PREFERRED EMBODIMENTS

Figure 1:
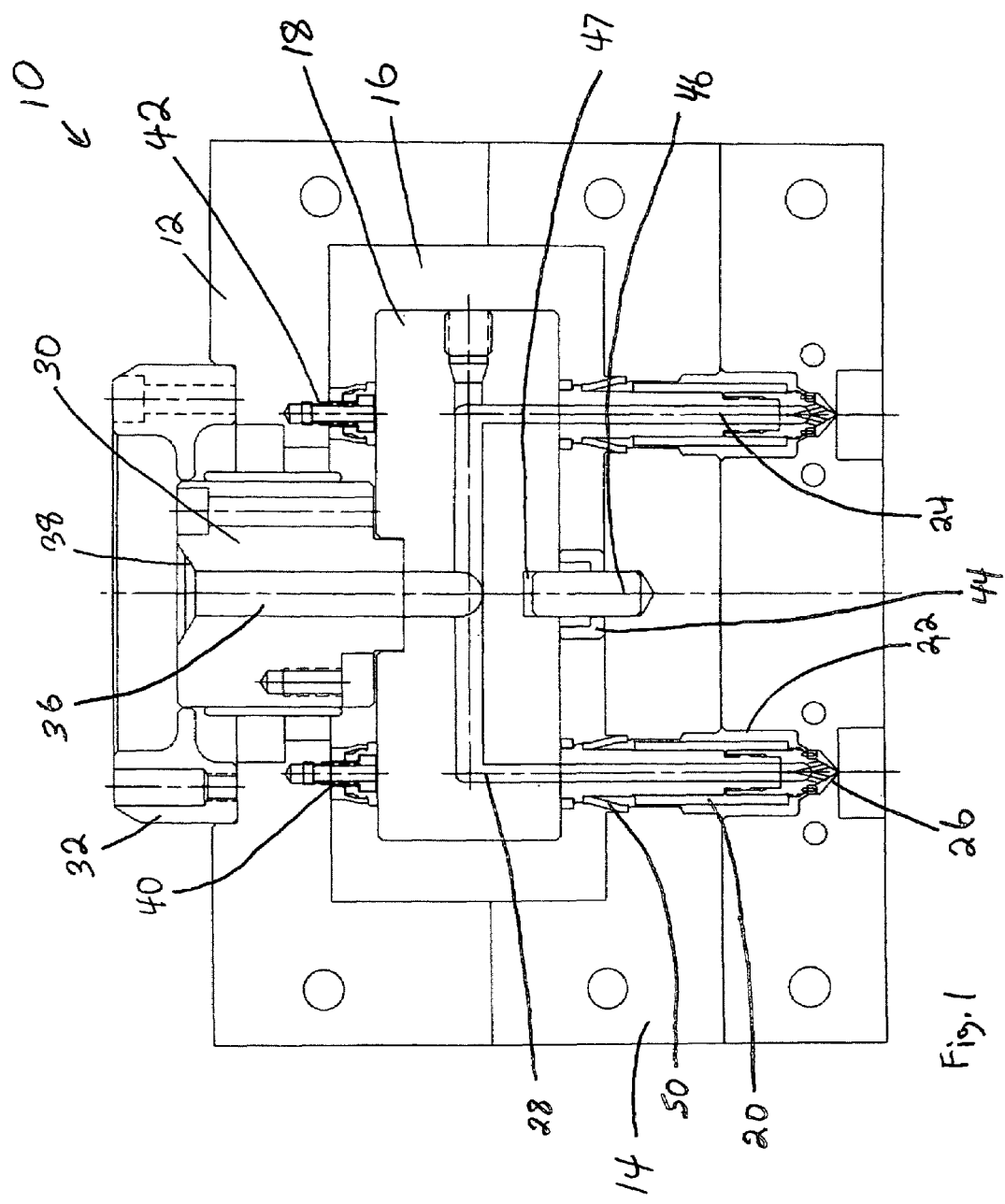
FIG. 1 is a fragmentary cross-sectional view showing a hot runner manifold block and adjacent mold elements for use in an injection molding machine.

Referring now to the drawings, and particularly to FIG. 1 thereof, there is shown a portion of the molding material flow passageway of a hot runner injection mold 10. The mold 10 includes a top clamp plate 12 and a nozzle retainer plate 14 positioned adjacent the clamp plate 12. The nozzle retainer plate 14 has a U-shaped cross section that defines a recess 16 adjacent a face of the clamp plate 12 for receiving a hot runner manifold block 18 that includes heating elements (not shown), preferably in the form of electrical resistance heaters.

Positioned between the manifold block 18 and nozzle retainer plate 14 is an injection nozzle body 20 that is received in an appropriately sized bore 22 formed in the retainer plate 14. The nozzle body 20 includes a central passageway 24 that terminates in a flow outlet 26 that is adapted to be in fluid communication with a gate to a mold cavity (not shown), as is generally known in the art. The nozzle passageway 24 communicates with a material flow channel 28 provided in the manifold block 18. A manifold extension 30 passes through the top clamp plate 12 and is retained in position by a locating ring 32 that is connected with the clamp plate 12 by means known generally in the art. The manifold extension 30 includes a central passageway 36 that communicates with the material flow channel 28 in the manifold block 18. At its outermost end, the central passageway 36 terminates in a seat 38 that is adapted to engage with an outlet of an injection unit barrel (not shown) that provides a source of molten molding material.

As shown in FIG. 1, the hot runner manifold block 18 is spaced from each of the top clamp plate 12 and nozzle retainer plate 14 by means of supports 40, 42, and 44 that are positioned between and are in contact with the opposed surfaces of the respective parts. The support 44 shown beneath the manifold block 18 in FIG. 1 is a conventional, known support structures, generally cylindrical or disk-like in configuration. The support 44 is retained in position by means of a dowel pin 46 that extends into the nozzle retainer plate 14 and that also serves to orient properly the nozzle retainer plate 14 and manifold block 18 by engaging with a mating hole 47 provided in the manifold block 18. The support 44 is attached to the nozzle retainer plate 14 by screws (not shown).

The injection nozzle body 20 is in contact with the manifold block 18 and includes an injection nozzle support collar 50 that extends between an outwardly-extending flange on the nozzle body 20 and a counterbore provided in the nozzle retainer plate 14.

On the face of the manifold block 18 opposite from the conventional support 44 is a manifold supports 40 and 42 to compensate for thermal expansion in accordance with the present invention. Supports 40 and 42 extends between and is in contact with the opposed faces of each of the top clamp plate 12 and hot runner manifold block 18.

As will be appreciated by those skilled in the art, the molten molding material passes into the central passageway 36 provided in the manifold extension 30, on into the material flow channel 28 in the manifold block 18, through the respective injection nozzle bodies 20, and finally into the respective mold cavities (not shown). To maintain contact between the manifold block 18 and injection nozzle body 20, thereby preventing leakage of the fluent molding material, the supports 40 and 42 preferably includes a spring arrangement whereby a continuous force is maintained on the manifold block 18 so that the manifold block 18 and injection nozzle body 20 do not separate.

Figure 2:
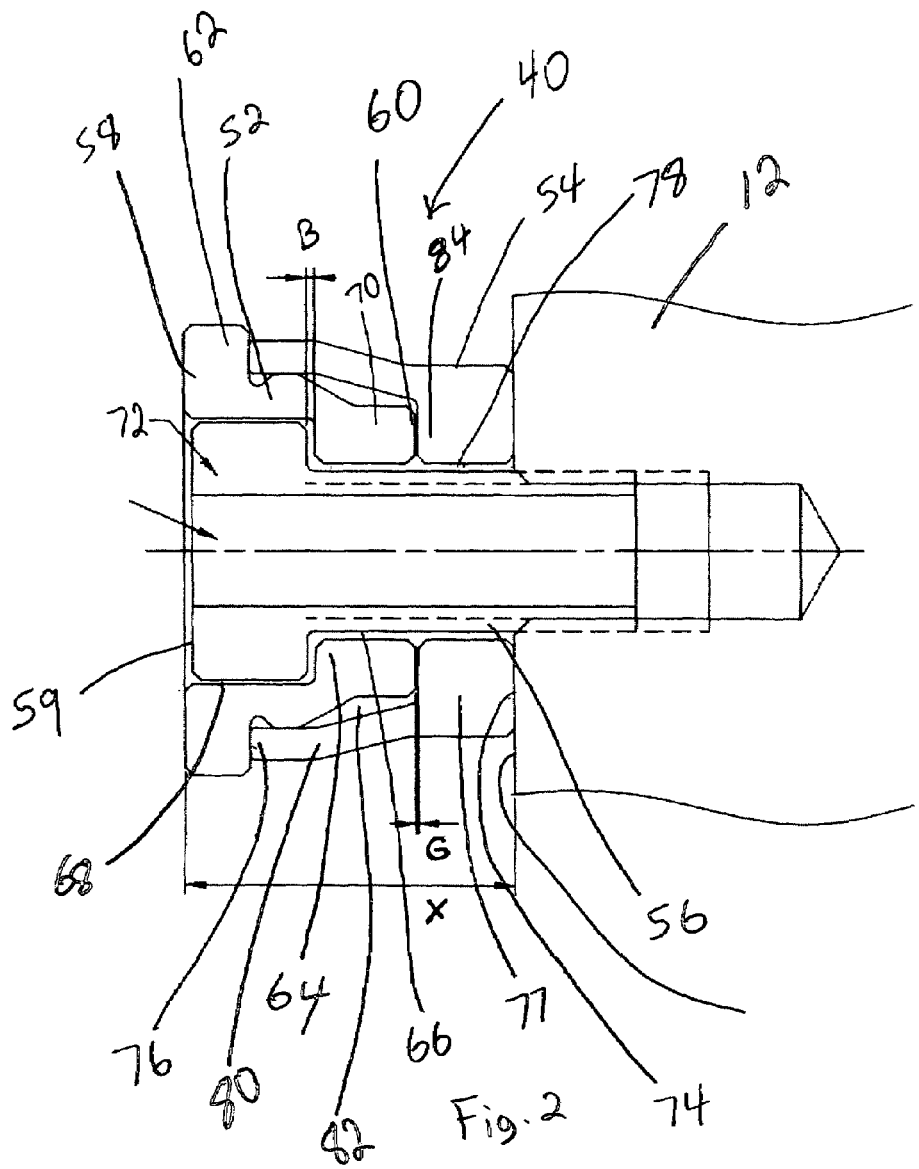
FIG. 2 is an enlarged, fragmentary longitudinal cross-sectional view of a manifold support in accordance with the present invention and shown in its pre-load position while the manifold support is mounted to the top clamp plate but not to the manifold.

Referring now to FIG. 2, there is shown in enlarged form, and in longitudinal cross section, a manifold support 40 in accordance with the present invention. The support 40 includes block member 52, spring member 54 and screw 56. Block member 52 is preferably a tubular steel member having opposite ends 58 and 60, shoulders 62 and 64, passage 66 and opening 68. Finger portion 70 is formed on block member 52 adjacent end 60 and opposite shoulder 62. Opening 68 is dimensioned and configured to retain head portion 72 of screw 56. Block member 52 is preferably made of hardened tool steel for sounder structural integrity. Spring 54 is a tubular member having opposite ends 74 and 76, barrel portion 77, passage 78 and skirt portion 80 extending from barrel portion 77. Skirt portion 80 forms recess 82. Skirt 80, recess 82 and finger portion 70 are dimensioned and configured such that the finger portion can be retained in the recess of the skirt. Spring 54 has internal shoulder 84 which projects into recess 82.

Spring 54 is made of a highly resilient metal alloy such that skirt portion 80 can act as a spring. Preferably, spring 54 is made of a metal having a relatively low thermal conductivity, such as titanium, in order to reduce the heat transfer between the manifold and the plate. The resiliency of the alloy forming spring 54 and the dimensions of skirt portion 80 are selected such that spring 54 and block member 52 are movable relative to each other between a first position shown in FIG. 3 wherein the end 60 of finger portion 70 is separated from internal shoulder 84 of spring 54 by a gap G and a second position, shown in FIG. 4, wherein end 60 abuts shoulder 84. Skirt portion 80 acts as a spring and deforms by bowing out in the direction indicated by arrows A as support 40 moves from its first position into its second position. Skirt 80 therefore acts as a spring and biases support 40 towards its first position. The length of support 40 between ends 58 and 74 changes between a longest length X as shown in FIG. 2 when the support is in its first position and a shorter distance Z as shown in FIG. 4 when the support is in its second position. When support 40 is in its second position, there is direct metal to metal contact between spring member 54 and block member 52. Lengths X and Z are controlled by carefully controlling the length of either block member 52 or spring member 54. For example, to decrease length Y, end 58 of block member 52 could be ground down slightly. To decrease length Z, end 60 of block member 52 could be ground down slightly.

Figure 3:
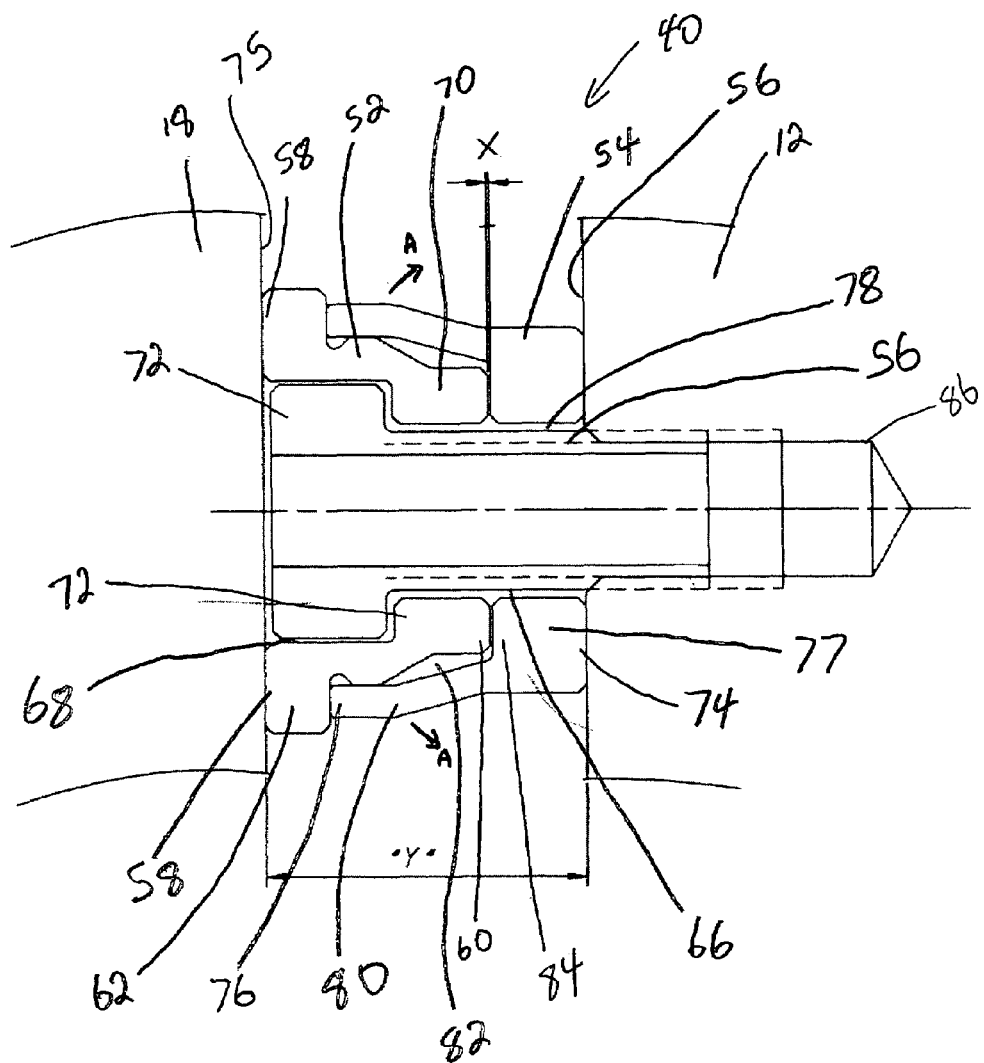
FIG. 3 is an enlarged, fragmentary longitudinal cross-sectional view of the manifold support of FIG. 2 while the manifold support is mounted to the top clamp plate and the manifold and showing the manifold support in its cold, start-up condition.
Figure 4:
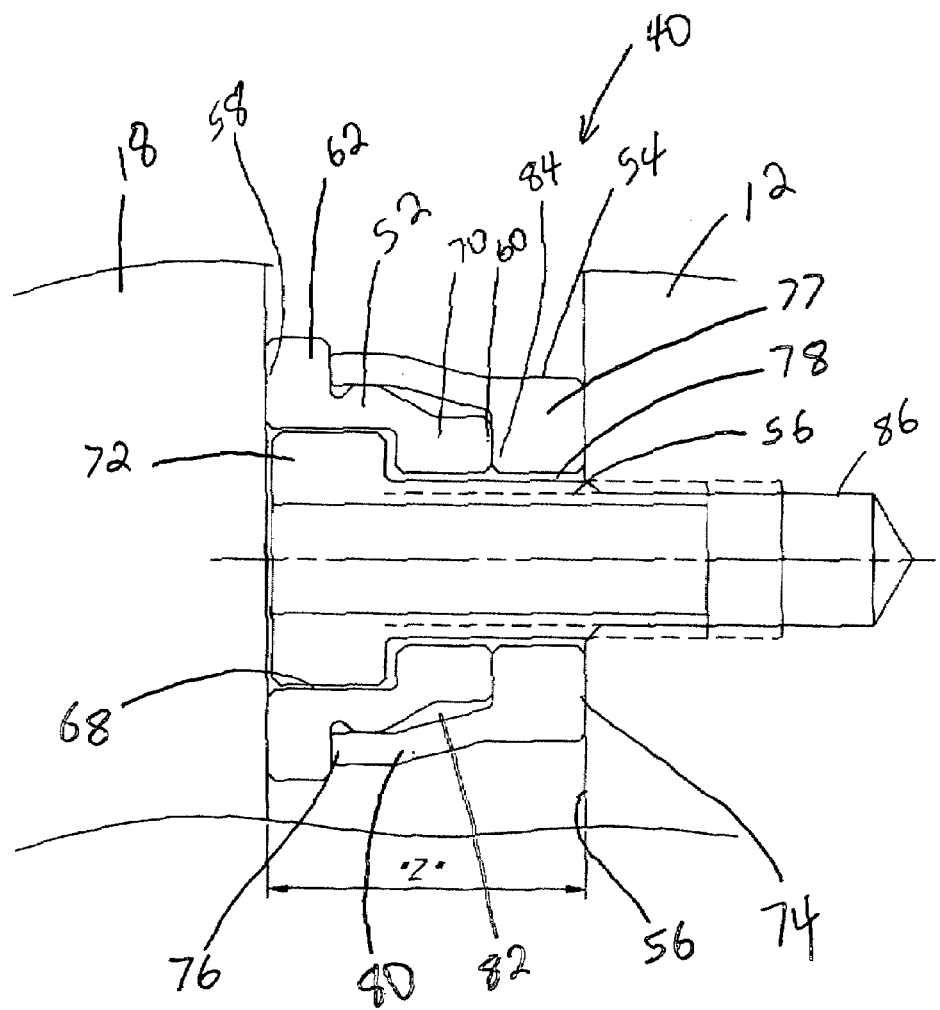
FIG. 4 is an enlarged, fragmentary longitudinal cross-sectional view similar to that of FIG. 3, but showing the respective mold parts at a point shortly before the mold reaches its normal operating temperature.

Referring now to FIGS. 2, 3 and 4, the operation of support 40 will now be discussed. When mounted to clamp plate 12, screw 56 of support 40 is tightened such that clearance B is left between screw head 72 and shoulder 82 (see FIG. 2). Clearance B permits block member 52 and spring member 54 to "float" relative to screw 56, permitting easy mounting and ensuring that the block member and spring member can freely move relative to each other. All of the components are at room temperature and support member 40 has length X. Hot runner 18 is then mounted such that support 40 is positioned between the hot runner and clamp plate 12. When hot runner 18 is fully mounted, end 58 of block member 52 will abut face 75 of the hot runner and end 74 will abut face 56 of clamp plate 12. In the processes of mounting hot runner 18, support 40 will be compressed slightly to length Y as shown in FIG. 3. Due to the biasing force generated by spring member 54, support will generate an initial seal off force sufficient to seal the manifold extension to the hot runner (see FIG. 1). The magnitude of this initial seal off force can be fine tuned by selectively grinding end 58 of the block member. The more is ground off end 58, the lower the initial seal off force.

During heating up of the hot runner to operating temperature, thermal expansion of the hot runner and other components causes support 40 to compress towards its second position, where the support "bottoms out" (see FIG. 4). A greater seal off force increases proportionally as the hot runner heats up to operational temperature and the support contracts. The exact sealing force generated by support 40 at operational temperature can be engineered by selecting the spring constants of the components, selecting the allowable deflection in the spring member and then carefully selecting lengths X and Z. Manipulating the length of X can ensure that an adequate initial seal off force will be generated at the lowest temperature plastic could be processed. By manipulating the length Z, the remainder of the systems expansion can be absorbed thereby increasing the factor of safety by generating more seal off force than would be required at operating temperature. Preferably, support 40 is dimensioned and configured such that the support bottoms out just before reaching the operating temperature (see FIG. 4) so that even if there is failure of spring member 54, there is still metal to metal contact in the support ensuring adequate sealing.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A thermal expansion compensation manifold support comprising:
   a) a first member having opposite first and second ends having outside diameters, a shoulder portion formed on the second end,
   b) a second member having opposite first and second ends, an internal recess formed on the second end of the second member, the recess defining a passage dimensioned to receive a portion of the first member adjacent the first end of the first member, the passage being further dimensioned to permit the first end of the second member to abut the shoulder of the first member, an internal shoulder being formed on the second member projecting into the passage, the second member being dimensioned and configured to form a spring which is resiliently deformable to permit the support to move between a first position wherein the first end of the first member is separated from the internal shoulder by a gap, and a second position wherein the first end of the first member abuts the internal shoulder, the spring biasing the support towards its first position.

2. The thermal expansion compensation manifold support defined in claim 1 wherein the first and second members are tubular and wherein the first member is mated to the second member in coaxial alignment.

3. The thermal expansion compensation manifold support defined in claim 2 wherein the first and second members have coaxial channels, the coaxial channels being aligned and further comprising a mounting screw dimensioned and configured to be received in the coaxially aligned channels.

4. A thermal expansion compensation manifold support comprising:
   a spring member having a barrel portion and a skirt portion extending from the barrel portion, the skirt portion forming a recess, the spring member having a first shoulder extending into the recess, the skirt portion having a skirt end opposite the barrel portion;
   a block member having opposite ends, a finger portion formed at one end and a second shoulder portion formed at the opposite end, the finger portion having an end opposite the second shoulder portion, the finger portion being dimensioned and configured to be inserted into the recess of the skirt portion, the skirt portion and the block member being dimensioned and configured such that when the finger member is inserted into the recess, the skirt end abuts against the second shoulder and the finger end is separated from the first shoulder by a gap;
   the spring member being made of a resilient metal and the skirt portion being dimensioned and configured such that the skirt portion forms a resilient spring allowing the support to be movable between a first position wherein the end of the finger is separated from the first shoulder by the gap, and a second position wherein the finger end abuts the first shoulder.

5. The thermal expansion compensation manifold support defined in claim 4 wherein the skirt flairs out from the barrel portion.

6. The thermal expansion compensation manifold support defined in claim 5 wherein the block and spring members each have passages, the passages being coaxially aligned, and further comprising a mounting screw for mounting the manifold support, the mounting screw being dimensioned to be retained in the passages.

7. The thermal expansion compensation manifold support defined in claim 6 wherein the block member has an opening adjacent the passage, the opening being dimensioned and configured to receive a head of the screw, the block member having a third shoulder adjacent the passage, the third shoulder dimensioned and configured to block the insertion of the screw head into the passage.

8. A thermal expansion compensation manifold support comprising:
   a tubular spring member having a barrel portion and a skirt portion flaring out from the barrel portion, the spring member forming a first shoulder where the skirt flares out from the barrel portion, the skirt portion having a skirt end opposite the barrel portion;

a tubular block member coaxially aligned with the spring member, a finger portion formed at one end of the block member and a second shoulder portion formed at an opposite end of the block member, the finger portion being dimensioned and configured to be inserted into the skirt portion of the spring member, the skirt portion and the block member being dimensioned and configured such that the skirt end abuts against the second shoulder and the finger is separated from the first shoulder by a gap;

the spring member being made of a resilient metal and the skirt portion being dimensioned and configured such that the skirt portion forms a resilient spring allowing the support to be resiliently movable between a first position wherein the finger is separated from the first shoulder by the gap, and a second position wherein the finger abuts the first shoulder, the spring member urging the support towards its first position.

9. The thermal expansion compensation manifold support of claim 8 wherein the spring member and the block member have coaxially aligned passages and further comprising a mounting screw for mounting the manifold support, the mounting screw being dimensioned to be retained in the passages.

10. The thermal expansion compensation manifold support of claim 9 wherein the block member has an opening adjacent the passage, the opening being dimensioned and configured to receive a head of the screw, the block member having a third shoulder adjacent the passage, the third shoulder dimensioned and configured to limit the insertion of the screw head into the passage.

* * * * *